United States Patent [19]

Bouboulis

[11] Patent Number: 4,638,031

[45] Date of Patent: * Jan. 20, 1987

[54] PROCESS FOR PREPARING SUPERIOR HIGH SOLIDS COATINGS

[75] Inventor: Constantine J. Bouboulis, Union, N.J.

[73] Assignee: Exxon Research & Engineering Co., Florham Park, N.J.

[ * ] Notice: The portion of the term of this patent subsequent to Jul. 30, 2002 has been disclaimed.

[21] Appl. No.: 701,680

[22] Filed: Feb. 14, 1985

Related U.S. Application Data

[63] Continuation-in-part of Ser. No. 558,953, Dec. 7, 1983, Pat. No. 4,532,294.

[51] Int. Cl.$^4$ .......................... C08K 5/10; C08L 33/14
[52] U.S. Cl. .................................... 524/773; 524/853; 524/902; 526/216
[58] Field of Search ........................ 524/773, 853, 902; 526/216

[56] References Cited

U.S. PATENT DOCUMENTS

| | | | |
|---|---|---|---|
| 3,267,057 | 8/1966 | Spiller | 260/22 |
| 3,271,375 | 9/1966 | Delacretaz | 260/85.5 |
| 3,348,965 | 10/1967 | Drum | 117/93.4 |
| 3,796,590 | 3/1974 | Spiller | 525/176 |
| 3,883,453 | 5/1975 | Takahashi | 524/733 |
| 4,075,242 | 2/1978 | Rhum et al. | 560/190 |
| 4,151,152 | 4/1979 | Schmitt | 260/33.6 |
| 4,276,212 | 6/1981 | Khanna | 260/39 |
| 4,369,296 | 1/1983 | Podszun | 526/209 |

FOREIGN PATENT DOCUMENTS

| | | |
|---|---|---|
| 27719 | 10/1980 | European Pat. Off. . |
| 29339 | 11/1980 | European Pat. Off. . |
| 29594 | 11/1980 | European Pat. Off. ........ 11001980/EPX European Pat. Off. |
| 1519258 | 1/1969 | Fed. Rep. of Germany . |

OTHER PUBLICATIONS

K. K. Mitra, "Electrostatic Application of Paint", *Paint India*, vol. 29, No. 9, pp. 52–56 (1979).
"Hexyl Acetate for the Coatings Industry", Enjay Chemical Company.
"Primary Amyl Acetate—A Unique Solvent for Paints Applied by Electrostatic Spray", Union Carbide Corporation.
"Acrylic Copolymer Oligomers for High Solids Coating Resins", *Journal of Coatings Technology*, D. Rhum et al., vol. 55, No. 703, Aug. 1983.
Federal Register, vol. 49, No. 16, 2921–2924, (1/24/80).

*Primary Examiner*—C. Warren Ivy
*Attorney, Agent, or Firm*—J. B. Murray, Jr.

[57] ABSTRACT

According to one aspect of the present invention, an improved method for preparing acrylic copolymer resins is provided in which the polymerization solvent comprises an alkanoic acid alkyl ester having a total of from about 7 to 18 carbon atoms per molecule. The monomers comprise hydroxy-substituted alkyl (meth)acrylates, and non-hydroxy substituted alkyl (meth)acrylates, and the process provides an improved method for forming low molecular weight acrylic resins useful as components in high solids acrylic coatings suitable for electrostatic spraying. The polymerization solvent can remain in the resin to become the solvent employed in the higher solids coating containing the thus-formed acrylic resins and provides surprisingly improved electrical resistivity and solvency and decreased surface tensions over prior art polymerization solvents. In accordance with another aspect of the present invention, an improved method for preparing high solids acrylic resin coatings is provided wherein an acrylic copolymer resin is dissolved in a coating solvent comprising at least one alkyl alkanoic acid ester having a total of from 7 to 18 carbon atoms per molecule.

17 Claims, No Drawings

PROCESS FOR PREPARING SUPERIOR HIGH SOLIDS COATINGS

CROSS-REFERENCE TO RELATED APPLICATION

This application is a continuation-in-part of co-pending U.S. Ser. No. 558,953, filed Dec. 7, 1983, now U.S. Pat. No. 4,532,294.

BACKGROUND OF THE INVENTION

1. FIELD OF THE INVENTION

This invention relates generally to a process for making acrylic coating resins and more specifically to superior solvents useful in the synthesis of high solids acrylic coating resins.

2. DESCRIPTION OF THE PRIOR ART

A large variety of acrylic coating compositions are known. Low solids coatings, i.e., those containing about 18 to 40 wt. % solids and the balance solvents, have heretofore been developed in which the resins themselves are characterized by high molecular weights, e.g., molecular weights in the range of 20,000 to 40,000. Such high solvent concentrations are required with these high molecular weight resins in order to supply flowability and other properties necessary for ease in applying a uniform coating. Due to strict air pollution regulations, pollution abatement of solvents is of paramount importance. To this end, the industry has expended much effort in an attempt to develop electrostatically sprayable coatings containing high solids contents, that is, coatings having a lower amount of solvents in order to satisfy pollution regulations. Attempts to achieve high solids coatings by merely using more of the conventional high molecular weight resins in the coatings have not been successful since the increased solids content using these resins results in an unacceptably high viscosity, and often the larger amounts of the resins cannot themselves be dissolved. Efforts at developing a "super solvent" for these conventional high molecular weight resins have also not proved to be successful. Therefore, coatings containing low molecular weight resins (e.g., for about 1,000 to 7,000 weight average molecular weight) would be desirable in high solids coatings in order to reduce the amount of solvents necessary in the blending for coating applications and, hence, the pollution difficulties associated with the solvents themselves. These high solids acrylic coatings are useful as exterior finish for automobiles, trucks, metal furniture, and as an appliance finish.

In U.S. Pat. No. 3,267,057, a polar solvent of high dielectric constant (greater than 8, preferably from 20–40) is employed with oil modified alkyd resins. However, adequate leveling was not achieved by these inventors in spraying of 67 wt. % solids coatings containing butyl acetate when sprayed by electrostatic atomization.

U.S. Pat. No. 3,348,965 discloses alkyd resin compositions which are capable of being sprayed electrostatically and incorporates polar organic solvents (butyl acetate is so classified) in its sprayable composition to increase conductivities.

U.S. Pat. No. 3,796,590 is directed to acrylic solution coating compositions which can be applied by electrostatic spraying employing solids contents of from 40 to 65 wt. % and organic solvents comprising aromatic hydrocarbon solvents alone or in combination with certain alcohols. Portions of butyl acetate are indicated as also being suitably present.

German Patent Publication No. 1,519,258 contains a disclosure (no examples) to the use of esters as polar solvents in electrostatic sprayable alkyd compositions, which was apparently added to the lacquer by the German patentees to decrease resistivities. The sprayable composition contained from about 45–55% by weight solids.

K. K. Mitra, "Electrostatic Application of Paint", *Paint India*, vol. 29, no. 9, pp. 52–56 (1979) indicates that while non-polar solvents (aliphatic and aromatic hydrocarbons chlorinated solvents, terpenes, etc.) can be employed in electrostatically sprayable paints to increase bulk and resistivity, polar solvents are used to control resistivity. The polar group is said to include ketones, alcohols, esters, ethers, ether alcohols, and nitro paraffins.

Also illustrative of prior art, high solids acrylic resins are those disclosed in U.S. Pat. No. 4,276,212 and in European Patent Application Nos. 27,719; 29,339; 29,594 and 29,683.

Solvents which are indicated to be typical in these references (e.g., those mentioned in European Patent Application No. 29,594) are: Toluene, xylene, butyl acetate, acetone, methyl isobutyl ketone, methyl amyl ketone, methyl ethyl ketone, butyl alcohol and other aliphatic, cycloaliphatic and aromatic hydrocarbons, esters, ethers, ketones, and alcohols.

U.S. Pat. No. 4,151,152 discloses fast setting polyurethane varnishes which can be applied by airless or electrostatic spraying, and discloses esters as suitable high boiling varnish solvents. Included as suitable esters are hexyl acetate, iso-amyl acetate and cyclohexyl acetate. Highly concentrated solutions are prepared containing from 50 to 70 percent solids which must then be diluted prior to use.

Also relevant is a brochure entitled "Hexyl Acetate for the Coatings Industry" (Enjay Chemical Company), published prior to 1980, which discloses the use of hexyl acetate as coating solvent in certain specific low solids acrylic coating compositions; in urethane coatings; in nitrocellulose coatings; and in baking enamels.

SUMMARY OF THE INVENTION

According to one aspect of the present invention, an improved method for preparing acrylic copolymer resins is provided in which the polymerization solvent comprises an alkanoic acid alkyl ester having a total of from about 7 to 18 carbon atoms per molecule. The monomers comprise hydroxy-substituted alkyl (meth)acrylates, non-hydroxy substituted alkyl (meth) acrylates, and the process provides an improved method for forming low molecular weight acrylic resins which are useful as components in high solids acrylic coatings suitable for electrostatic spraying. The polymerization solvent can remain in the resin to become the solvent employed in the higher solids coating containing the thus-formed acrylic resins and provides surprisingly improved electrical resistivity, and solvency and decreased surface tensions over prior art polymerization solvents.

In addition, the solvents of this invention provide the low-molecular weight acrylic resins over a wide range of temperatures. Certain of the solvents allow the use of lower temperatures which give significant process advantages, among them lower energy requirements and ease of pollution control, while other solvents (such as the higher alkyl ester solvents) of this invention have been found to result in polymers having still narrower molecular weight distributions. Surprisingly, the solvents of this invention produce low molecular weight acrylic copolymers which are characterized by superior molecular weight and viscosity properties, and are therefore especially suited for use in high solids coatings.

In accordance with another aspect of the present invention, an improved method for formulating high solids acrylic coatings is provided wherein an acrylic copolymer resin is dissolved in a coating solvent comprising at least one alkyl alkanoic acid ester having a total of from 7 to 18 carbon atoms per molecule.

The coatings thereby formulated have excellent flow properties, higher resistivities than prior art coatings containing ketones and when applied to surfaces provide high gloss and high impact strength in the as-applied coating.

DETAILED DESCRIPTION OF THE INVENTION

According to one aspect of the improved process of this invention, acrylic polymers are prepared by contacting under polymerizing conditions a hydroxy-substituted alkyl (meth)acrylate and a non-hydroxy substituted alkyl (meth)acrylate in the presence of a free radical polymerization catalyst and a polymerization solvent comprising at least one liquid alkyl alkanoic acid ester having a total of from 7 to 18 carbon atoms.

The mono-esters suitable in this invention therefore comprise normally liquid esters selected from the group consisting of compounds having the formula (I):

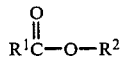

(I)

wherein $R^1$ is a straight or branched chain alkyl of from 1 to 6 carbon atoms, and $R^2$ is a straight or branched chain alkyl of from 1 to 13 carbon atoms, with the proviso that $R^1$ and $R^2$ together contain from 6 to 17 carbon atoms, and mixtures thereof. Exemplary of such ester solvents are hexyl acetates, pentyl acetates, pentyl propionates, isobutyl isobutyrate, heptyl acetates, methyl pentanoates, ethyl pentanoates, pentyl pentanoates, ethyl hexanoates, butyl hexanoates, ethyl neopentanoate, methyl neoheptanoate octyl acetates, nonyl acetates, decyl acetates, undecyl acetates, dodecyl acetates, tridecyl acetates and the like.

Preferred ester solvents of this invention are normally liquid esters selected form the group consisting of compounds of the formula (II):

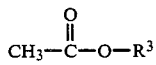

(II)

wherein $R^3$ is a straight or branched-chain alkyl having from 5 to 8 carbon atoms, and mixtures thereof. Exemplary of such preferred ester solvents herein are pentyl acetates, hexyl acetates, heptyl acetates, and octyl acetates. Especially preferred as ester polymerization solvents are hexyl acetate and heptyl acetate.

Also preferred as ester solvents of this invention are normally liquid higher alkyl esters selected from the group consisting of compounds of the formula (IIa)

wherein $R^1$ is as defined above and $R''$ is a straight or branched-chain alkyl having from 8 to 13 carbon atoms with the proviso that $R^1$ and $R''$ together contain from 11 to 15 carbon atoms and mixtures thereof. Preferred higher alkyl ester solvents are those having the formula

wherein $R''$ is as defined above. Exemplary of this group of preferred higher alkyl esters are, nonyl acetates, decyl acetates, undecyl acetates and dodecyl acetates, tridecyl acetates.

The term "normally liquid esters" as used herein is intended to refer to esters which are in the liquid state at ambient conditions (25° C., 1 atm.). The ester solvents are preferably substantially free of water (more preferably having a water content of less than 0.5 wt. %) and trace metals (more preferably having a trace metals content of less than 0.004 wt. %). In addition, the ester solvent is most preferably substantially free of alcohol (e.g., less than 0.6 wt. % alcohol), such as alcohol remaining from the process by which the ester solvents are produced (e.g., alcohols of the formula $R^2OH$, wherein $R^2$ is as defined above), and is preferably characterized by a resistivity of at least 15 megohms, as determined by Ransburg resistivity meter.

The hydroxy-substituted alkyl (meth)acrylates which can be employed comprise members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate 2-hydroxy-1-methylethyl methacrylate; 2-hydroxy-propyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl (meth)acrylates including those listed above could be employed, the preferred hydroxy functional monomers for use in the resin of this invention are hydroxy-substituted (meth)acrylates, meaning alkyl acrylates and methacrylates having a total of 5 to 7 carbon atoms, i.e., esters of $C_2$–$C_3$ dihydric alcohols and acrylic or methacrylic acids.

Most preferably, the hydroxy-substituted alkyl (meth)acrylate monomer comprises a compound of the formula (III):

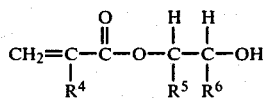

(III)

wherein $R^4$ is hydrogen or methyl and $R^5$ and $R^6$ are independently selected from the group consisting of hydrogen and alkyl of from 1 to 6 carbon atoms. Illustrative of these particularly suitable hydroxy-substituted alkyl (meth)acrylate monomers are 2-hydroxy ethyl methacrylate, 2-hydroxyethyl acrylate, 2-hydroxypropyl acrylate, 2-hydroxybutyl acrylate and 2-hydroxy-1-methylhexyl acrylate.

Among the non-hydroxy substituted alkyl (meth)acrylate monomers which may be employed are (meth)acrylates (as before, meaning esters of either acrylic or methacrylic acids) as well as mixtures of acrylates and vinyl hydrocarbons. Preferred non-hydroxy unsaturated monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethyl-hexylacrylate, lauryl-methacrylate, glycidyl methacrylate, etc.

Particularly preferred non-hydroxy substituted monomers are compounds selected from the group consisting of monomers of the formula (IV):

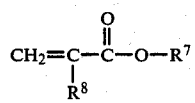

(IV)

wherein $R^7$ is alkyl of from 1 to 6 carbon atoms and $R^8$ is hydrogen or methyl. Particularly preferred are butyl acrylate, butyl methacrylate and methyl methacrylate.

The total monomer mixture passed to the polymerization process step will generally comprise from about 5 to 40 wt. %, and preferably from about 10 to 30 wt. %, of the hydroxy-substituted alkyl (meth)acrylate and from about 5 to 95 wt. %, preferably from about 60 to 90 wt. % of the non-hydroxy substituted alkyl (meth)acrylate monomer, in addition to any optional monomers (discussed below). The non-hydroxy substituted (meth)-acrylate will typically comprise a mixture of methyl meth-acrylate or methyl acrylate, which will be present in an amount of from about 5 to 30 wt. %, more preferably from about 10 to 25 wt. %, of the total monomer mixture, and up to about 60 wt. %, more preferably from about 25 to 45 wt. %, of the total monomer mixture of butyl acrylate, butyl methacrylate, or mixtures thereof.

Additional optional monomers which can be employed in the polymerization are monovinyl aromatic hydrocarbons containing from 8 to 12 carbon atoms, including styrene, alpha-methyl styrene, vinyl toluene, t-butyl styrene, chlorostyrene and the like. Where employed, these optional monovinyl hydrocarbons will be generally present in an amount of from about 5 to 30 wt. %, preferably from about 10 to 20 wt. % of the total monomer mixture.

In addition, other modifying monomers such as vinyl chloride, acrylonitrile, methacrylonitrile, vinyl acetate and acrylic acid may also be present. In the case of acrylic acid, when employed, this monomer will generally be present in an amount from about 2 to 5 wt. % of the total monomer mixture. The remaining above-mentioned modifying monomers will generally be present in an amount of from 3 to 10 wt. % of the monomer mixture, where employed.

The ester polymerization solvent of this invention can be used alone or admixed with other solvents such as ketones, ethers, alcohols, aromatic solvents, and the like. Suitable ketone solvents are methyl amyl ketone, methyl isobutyl ketone, methyl propyl ketone and the like. Suitable ether solvents are glycol ether acetates (e.g., ethoxy ethanol acetate, methoxy propanol acetate and the like). Suitable aromatic solvents comprise at least one aromatic hydrocarbon solvent containing as a majority component an alkyl-substituted benzene in which the alkyl substituent comprises a total of at least 2 carbon atoms when the benzene ring is mono-alkyl substituted and of at least 3 carbon atoms when the benzene ring is substituted by two or more alkyl groups. More preferably, the aromatic solvent component comprises an alkyl-substituted benzene of the formula (V):

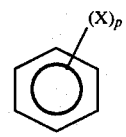

(V)

wherein p is an integer of from 1 to 4, and X is in each instance in which it appears independently selected from the group consisting of straight and branched-chain alkyl of from 1 to 4 carbon atoms, with the proviso that when p is 1, X must contain at least 2 carbon atoms and with the further proviso that when p is 2 or greater, the X groups must contain a total of at least 3 carbon atoms, and mixtures of the foregoing aromatic compounds.

Illustrative of suitable alkyl-substituted benzene solvents for use in the solvent blends of this invention are ethyl benzene, isopropyl benzene, n-propyl benzene, 1-methyl-3-ethylbenzene, 1-methyl-4-ethylbenzene, 1,3,5-trimethylbenzene, 1-methyl-2-ethylbenzene, 1,2,4-trimethylbenzene, isobutylbenzene, sec-butylbenzene, 1-methyl-3-isopropylbenzene, 1-methyl-4-isopropylbenzene, 1,2,3-trimethylbenzene, 1-methyl-2-isopropylbenzene, 1,3-diethylbenzene, 1-methyl-3-n-propylbenzene, n-° ° butylbenzene, 1,4-diethylbenzene, 1,3-dimethyl-5-ethylbenzene, 1,4-dimethyl-2-ethylbenzene, 1,3-dimethyl-4-ethylbenzene, 1,2-dimethyl-4-ethylbenzene, 1,2,4,5-tetramethylbenzene, 1,2,3,5-tetramethylbenzene and the like, and mixtures of the foregoing.

The aromatic solvent component can also contain up to about 50 wt. %, preferably less than about 40 wt. %, and more preferably up to about 25 wt. %, of other hydrocarbon solvents such as $C_6$ to $C_{14}$ aromatic solvents not satisfying the definition of formula III above, as well as $C_6$ to $C_{14}$ saturated aliphatic and cycloaliphatic hydrocarbons.

Especially preferred such polymerization solvent mixtures are those wherein the higher liquid esters of this invention comprise at least about 40 wt. %, and more preferably from about 60 to 80 wt. %, of the solvent mixture, and an aromatic solvent of formula (V) comprises up to about 60 wt. %, and more preferably from about 20 to 40 wt. %, of the solvent mixture.

In preparing the polymers of this invention, the selected monomers, including the required hydroxy-substituted alkyl (meth)acrylate, and non-hydroxy substituted alkyl (meth)acrylate, together with any modifying or other monomers, may be mixed and reacted by conventional free radical initiated polymerization in such proportions as to obtain the copolymer desired, this reaction being effected in the presence of the ester solvent of this invention. A large number of free radical initiators are known in the art and are suitable for the purpose. These include benzoyl peroxide; lauryl peroxide; t-butylhydroxy peroxide; acetylcyclohexylsulfonyl peroxide; diisobutyryl peroxide; di-(2-ethylhexyl) peroxydicarbonate; diisopropylperoxydicarbonate; t-butylperoxypivalate; decanoyl peroxide; azobis-(2-methylpropionitrile); 2-t-butylazo-2-cyanobutane; tertiary butyl perbenzoate, etc. dicumyl peroxide, ethyl 3,3-(t-amylperoxy)butyrate, ethyl 3,3-di(t-butylperoxy)-butyrate, t-butyl cumyl peroxide, and di-butyl cumyl peroxide, and di-t-butyl peroxide, and other dialkyl peroxides, peroxy ketals, and t-amyl peroxides.

The total monomer mixture to be employed in preparing the polymers according to the process of this invention will generally comprise from about 30 to 95 wt. %, preferably from about 50 to 90 wt. %, of the total mass of monomers and solvent passed to the polymerization reaction vessel. Thus, the ester solvents of this invention will generally comprise from about 10 to 70 wt. %, preferably from about 10 to 50 wt. %, of the total mass of monomers and solvent passed to the polymerization vessel. The quantity of free radical initiators employed as catalyst in the reaction can also vary widely and will generally be present in an amount of from about 0.5 to 6 wt. % of the total monomer components charged to the reaction mixture.

The conditions of temperature and pressure for conducting the polymerization reaction can vary widely. Generally, the polymerization will be conducted at a temperature of from about 125° to 240° C. (and preferably from about 4° to 210° C.) at atmospheric pressure. Pressures of from about 10, or 500 psig are entirely suitable, although higher or lower pressures can be employed. The polymerization reaction can be carried out in any of the conventional equipment employed by the industry for such reactions. Thus, the reaction vessel can comprise a stirred reactor in which an inert atmosphere (e.g., $N_2$, Ar) is maintained during the polymerization to avoid reactions with gaseous oxygen which compete, or interfere, with the desired polymerization reaction.

The polymerization process can be carried out batchwise, semi-continuously, or continuously. The monomers and solvent can be premixed or passed separately to the polymerization vessel alone, or in combination with the free radical initiators and other components.

The time for which the polymerization reaction is allowed to proceed can also vary widely and will generally range from about 0.5 to 10 hours, preferably from about 1 to 6 hours.

The acrylic resins produced by the process of this invention are generally characterized by weight average molecular weights ($M_w$) from about 800 to 12,000, and preferably from about 1,000 to 10,000, and more generally from about 1,000 to 8,000. Also, the acrylic resins produced by the process of this invention will be generally characterized by number average molecular weights ($M_n$) falling within a range of from about 500 to 6,000, and more typically from about 700 to 3,500, and by $M_w/M_n$ ratios of from about 1 to 5, and more typically from about 1 to 4. Furthermore, the acrylic resins of the present invention will be generally characterized by kinematic viscosities of up to 6,000 cs, and more typically from 100 to 5,000 cs (as determined by ASTM D445). These acrylic resins can then be employed in the formulation of coatings with or without the addition of other solvents. The components of such coating compositions formulated using these acrylic resins can be any of the conventional catalysts, antioxidants, UV absorbers and stabilizers, surface modifiers, wetting agents as well as pigments. These materials are conventional and a more complete description thereof is not necessary for a full understanding of this invention. For example, illustrative conventional UV absorbers and stabilizers are illustrated by those discussed in European Patent Application No. 29,594.

The coatings prepared by use of the acrylic resins of this invention can be applied to substrates, such as automobiles and the like, using conventional methods known to the art, such as roller coating, spray coating, electrostatic spray coating, dipping or brushing. Of course, the particular application technique will depend on the particular substrate to be coated and the environment in which the coating operation is to take place. A particularly preferred technique for applying the high solids compositions, particularly when applying the same to automobiles as top coats, is spray coating through the nozzle of a spray gun.

In accordance with another embodiment of the present invention, an improved method for formulating a high solids acrylic resin coating, intended for use in electrostatic spray applications, is provided wherein the acrylic resin, which is formed by conventional techniques or by use of the aforementioned improved polymerization process using an ester solvent of this invention, is formulated into a high solids coating by use of a normally liquid ester solvent selected from the group consisting of compounds having the formula (I), as defined above. The normally liquid ester solvent can be employed in an amount of from about 10 wt. % to about 90 wt. % of the as-formulated coating composition, which is preferably formulated to contain high solids (that is, at least about 50 wt. % solids) and preferably from about 50 to 90 wt. % solids, and most preferably from about 55 to 80 wt. % solids.

As with the previously discussed embodiment of this invention, the acrylic resin and ester coating solvent of this invention can be employed in combination with any of the conventional catalysts, anti-oxidants, UV absorbers and stabilizers, surface modifiers, wetting agents and pigments which are known in the art. These materials, again, are conventional and a more complete description thereof is not necessary for full understanding of this invention. For example, illustrative conventional UV absorbers and stabilizers are those illustrated by the discussion of European Patent Application No. 29,594 and by the surface modifiers and pigments described in European Patent Application No. 29,339, the disclosures of which are hereby incorporated by reference.

The coating which is so formulated can also contain the selected normally liquid ester solvent of this invention in combination with any of the above-discussed solvents which are capable of use as polymerization cosolvents, or sole solvents. Among these additional coating co-solvents are toluene, xylene, acetone, methyl isobutyl ketone, methyl ethyl ketone, butyl alcohol, aromatic solvents, aliphatic solvents, cycloaliphatic solvents, cumene, methyl amyl ketone, and the like which are conventionally used in coating compositions.

The novel coating compositions of this invention can be applied to a variety of substrates such as metal, wood, glass and plastics such as polypropylene, styrene, polyurethane and copolymers of styrene, by any of the usual application methods such as by spraying, electrostatic spraying, dipping, brushing, flow coating, rolling and the like. Most preferably, the novel coating compositions of this invention are applied by electrostatic spraying.

The thus-formed coatings can be air-dryed or baked. The resulting coating is preferably from about 0.2 to 3 mils thick, and preferably 0.4 to 2.5 mils thick, and can be rubbed or polished in accordance with conventional techniques, if desired, to improve smoothness or apparent gloss or both.

After the novel coating composition is applied, the coating is preferably cured at about 80 to 210° C. for about 5 to 45 minutes. Typical catalysts that can be used are butyl acid phosphate, paratoluene sulfonic acid, naphthalene sulfonic acid and naphthalene disulfonic acids (as described in U.S. Pat. Nos. 3,979,478 and 4,075,176), amine salts of any of the foregoing, and the like.

The process and compositions of this invention can be further illustrated by reference to the following examples, wherein parts are by weight unless otherwise indicated.

In the Examples, unless otherwise indicated, the following test procedures or devices were used for determining the corresponding properties:

TABLE 1

| Property Measurement | Test Method/Device |
|---|---|
| Impact resistance (reverse) | ASTM D2794-69 |
| Gloss | ASTM D523 |
| Viscosity | Zahn cup #2, ASTM D3794; or Ubbelohde viscometer, ASTM D445 |
| Pencil Hardness | ASTM D2794-69 |
| Flash Point (TCC) | ASTM D-56 |
| Electrical Resistivity | Ransburg 5650 paint resistance tester (manufactured by Ransburg) |
| Film Thickness | ASTM D1186, modified by use of a Positector 2000 (manufactured by KTA-Tator, Inc.) Magnetic digital thickness meter |
| Color | ASTM D2849 (Gardner color scale) |
| Evaporation rate | ASTM D3539-76 (Method B) |
| Surface Tension | ASTM D1331 |
| Appearance | Visual examination of paint film for smoothness; absence of pinholes, cratering, orange peel and wrinkling. |

Percent solids reported in the Examples are nominal solids, calculated based on the amount of solids added to the recited mixtures.

The primary amyl acetate used in the Examples is manufactured by Union Carbide Corporation and is a mixture of 2-methyl-butyl acetate, 3-methyl-butyl acetate and n-pentyl acetate. The hexylacetate and heptylacetate used in the Examples were products of an esterification reaction between acetic acid and the corresponding hexyl or heptyl alcohol. The alcohol precursors themselves were formed in a commercial oxo reaction and each comprised a mixture of normal-and iso-alcohols. (Similar results would be achieved if pure normal- or iso-hexyl or heptyl alcohols were used.)

In the Examples, AROMATIC ™ 100 solvent (manufactured by Exxon Company USA) comprised a narrow-cut aromatic solvent containing about 40 wt. % trimethyl benzenes, 35 wt. % methyl ethyl benzenes, 10 wt. % propyl and isopropyl benzenes, 3 wt. % ethyl dimethyl benzenes, 2 wt. % methyl (n- and iso-) propyl benzenes, 2 wt. % diethyl benzenes, <1 wt. % each of mono butyl benzenes and tetramethyl benzenes, 6 wt. % xylenes and minor amounts of ethyl benzene, $C_{10}$ and $C_{11}$ saturates and unknowns.

Number average molecular weights ($M_n$) and weight average molecular weights ($M_w$) were found by gel permeation chromatography.

EXAMPLE 1

To a five liter flask equipped with a mechanical stirrer, an addition funnel and a reflux condenser was added, in a series of runs, 350 grams of the selected ester solvent and 150 grams of AROMATIC ™ 100 solvent (Exxon Company USA) as the polymerization solvent. The addition funnel (2 liter capacity) contained:

TABLE 2

| | Grams | Wt. % |
|---|---|---|
| 2-hydroxyethyl methacrylate | 240 | 20 |
| Methyl methacrylate | 240 | 20 |
| Styrene | 120 | 10 |
| Butyl acrylate | 568 | 47.3 |
| Acrylic acid | 32 | 2.7 |
| | 1,200 | 100.0 |

Added to the above mixture in the addition funnel was 56 grams of t-butylperbenzoate. The liquids in the two addition funnels and in the reaction flask were kept under a nitrogen blanket (1 atm. $N_2$). The solvent blend in the reaction flask was heated at the indicated reaction temperature and the contents of the two funnels were added slowly, with stirring over a period of 2 hours. After completion of the addition, stirring and heating was continued for an additional one-half hour. Then 4 more grams of t-butyl perbenzoate dissolved in a blend of 14 gms of the selected ester solvent and 6 gms of AROMATIC 100 solvent were added in small portions and stirring and heating was continued for ½ hour to complete the polymerization. The thus-produced polymerized resins were then tested for their physical properties, yielding the data set forth in Table 3 below:

TABLE 3

| | Polymerization in Ester Solvent/Aromatic Solvent Blends | | | | | |
|---|---|---|---|---|---|---|
| | Run No. | | | | | |
| | 1-1 | 1-2 | 1-3 | 1-4 | 1-5 | 1-6 |
| | Ester Solvent | | | | | |
| Resin Properties | n-butyl acetate | primary amyl acetate | iso-butyl iso-butyrate | hexyl acetate | heptyl acetate | heptyl acetate |
| Resin Viscosity[1] (CS) | 8,640 | 4,180 | 5,337 | 3,940 | 4,739 | 2,655 |
| Color Gardner | <1 | <1 | <1 | <1 | <1 | <1 |
| Electrical Resistivity (Megohms) | >20 | >20 | >20 | >20 | >20 | >20 |

TABLE 3-continued

Polymerization in Ester Solvent/Aromatic Solvent Blends

| Resin Properties | Run No. | | | | | |
|---|---|---|---|---|---|---|
| | 1-1 | 1-2 | 1-3 | 1-4 | 1-5 | 1-6 |
| | Ester Solvent | | | | | |
| | n-butyl acetate | primary amyl acetate | iso-butyl iso-butyrate | hexyl acetate | heptyl acetate | heptyl acetate |
| Polymer Solids (wt. %) | 70 | 70 | 70 | 70 | 70 | 70 |
| $M_w$ | 15,789 | 7,044 | 7,070 | 5,790 | 6,168 | 5,097 |
| $M_n$ | 2,620 | 1,660 | 1,550 | 1,600 | 1,800 | 1,285 |
| $M_w/M_n$ | 6.0 | 4.2 | 4.5 | 3.6 | 3.4 | 3.9 |
| Reaction Temp. (°C.) | 136[2] | 146[2] | 151[2] | 150 | 150 | 162 |

[1]Measured as kinematic viscosity, obtained with an Ubbelohde viscometer, ASTM D445.
[2]Reflux temperature.

From the data in Table 3 it can be seen, therefore, that the ester solvents of this invention (Runs 1-2 through 1-6) provide significantly enhanced resin properties and permit the formation of high solids resin solutions characterized by lower resin viscosities, much lower weight average molecular weights and narrower molecular weight distribution (i.e., lower $M_w/M_n$ ratios). The solvents of this invention provide acrylic resins which are uniquely suited for use in electrospray high solids applications.

EXAMPLE 2

The polymerized resins obtained in Example 1 (without removal of the polymerization solvent) were then used to formulate a series of paint coating compositions employing the selected coating solvent and the additional coating ingredients identified in Table 4.

TABLE 4

| | Runs 2-1 to 2-5: | | Run 2-6 | |
|---|---|---|---|---|
| | wt. (gms) | wt. % | wt. (gms) | wt. % |
| Resin[1] | 309.4 | 36.4 | 340 | 40.0 |
| Ester solvent | 151.3 | 17.8 | 125 | 14.7 |
| AROMATIC 100 | 56.1 | 6.6 | 41.7 | 4.9 |
| n-Butanol | 40.0 | 4.7 | 33.1 | 3.9 |
| CYMEL 303[2] | 85.0 | 10.0 | 93.5 | 11.0 |
| TiO$_2$[3] | 204.0 | 24.0 | 212.5 | 25.0 |
| BYK Catalyst 451[4] | 4.2 | 0.5 | 4.2 | 0.5 |

TABLE 4-continued

| | Runs 2-1 to 2-5: | | Run 2-6 | |
|---|---|---|---|---|
| | wt. (gms) | wt. % | wt. (gms) | wt. % |
| Total | 850.0 | 100.0 | 850.0 | 100.0 |

[1]Resin as charged included the polymerization solvent.
[2]Hexamethoxymethyl melamine, 100% solid resin (produced by American Cyanamid) as crosslinking amino resin.
[3]Ti-pure (E. I. Dupont Nemours, Nemours Pigments Division) as pigment.
[4]p-Toluene sulfonic acid, 30% solution in isopropanol, neutralized with pyridine (Mallincrodt), as cure catalyst.

In each run, the selected resin and ester coating solvent, together with the remaining Table 4 components (other than the BYK cure catalyst), were placed in a ceramic pebble mill (Paul O. Abbe, Inc., Little Falls, N.J.) which was then rolled on mill rollers for a time of 12 hours. The liquid coating was then filtered using a Gardco paint filter; fine—60×45 mesh to remove gel particles, and then mixed with the cure catalyst to form the paint coating composition. Each paint coating composition was tested to determine its physical properties (giving the data summarized in Table 5), and then employed to form a 3 mil (wet) film on selected flat, substrate panels using a drawdown blade. After baking of the drawdown films in an oven at 350° F. for 15 minutes, the dried paint films were then tested, again giving data summarized in Table 5.

The data in Table 5 illustrate the improved liquid coating viscosities obtained with ester solvents of this invention at equivalent solids levels to the prior art butyl acetate solvent. This can be seen in comparing the viscosities of Runs 2-2 through 2-5 with the viscosity of the liquid coating formulated in Run 2-1.

TABLE 5

Paint Formulations and Surface Film

| | Run No. | | | | | |
|---|---|---|---|---|---|---|
| | 2-1 | 2-2 | 2-3 | 2-4 | 2-5 | 2-6 |
| | Resin Prepared in Run No. | | | | | |
| | 1-1 | 1-2 | 1-3 | 1-4 | 1-6 | 1-6 |
| | Ester Coating Solvent | | | | | |
| | n-butyl acetate | primary amyl acetate | iso-butyl iso-butyrate | hexyl acetate | heptyl acetate | heptyl acetate |
| Properties of Liquid Coating: | | | | | | |
| Electrical resistivity (megohms) | 1.3 | 1.6 | 1.7 | 1.8 | 1.7 | 2.0 |
| Viscosity Zahn #2 (sec.) | 24.7 | 21.8 | 21.6 | 21.0 | 20.8 | 27.1 |
| Percent solids (wt %) | 60 | 60 | 60 | 60 | 60 | 65 |
| Flash Point (°F.) | 81 | 90 | 87 | 99 | 101 | — |
| Film Properties:[1] | | | | | | |
| Gloss 20° | 74 | 74 | 71 | 76 | 75 | 68 |
| 60° | 91 | 91 | 89 | 92 | 91 | 91 |
| Impact resistance (in-lbs) | 80 | 80 | 80 | 82 | 92 | 84 |
| Pencil hardness | 3H | 2H | 2H | 2H | 2H | 3H |

TABLE 5-continued

Paint Formulations and Surface Film

| | \multicolumn{6}{c}{Run No.} | | | | | |
|---|---|---|---|---|---|---|
| | 2-1 | 2-2 | 2-3 | 2-4 | 2-5 | 2-6 |
| | | | Resin Prepared in Run No. | | | |
| | 1-1 | 1-2 | 1-3 | 1-4 | 1-6 | 1-6 |
| | | | Ester Coating Solvent | | | |
| | n-butyl acetate | primary amyl acetate | iso-butyl iso-butyrate | hexyl acetate | heptyl acetate | heptyl acetate |
| Appearance | good | poor | good | good | good | good |

(1)Determined using phosphatized steelpanels (Bonderite ® 40 treated; manufactured by Parker Chemical Co.) as the substrate on which drawdown films were formed.

EXAMPLE 3

A series of eight resins were formed using the polymerization procedure of Example 1 except that the polymerization solvent comprised 520 grams of the selected liquid ester solvent at the reaction temperatures, indicated in Table 6.

The thus-produced resins were then tested for their physical properties, yielding the data set forth in Table 6 below.

As can be seen from the data set forth in Table 6, the ester solvents of this invention in Runs 3-2 through 3-8 are superior polymerization solvents in forming the high solids acrylic resins. The resin viscosities are significantly reduced when the ester solvents of this invention are employed, as compared to the unacceptably high resin viscosity achieved by use of the prior art butyl acetate in Run 3-1. In addition, the ester solvents of this invention achieved greatly lowered weight average molecular weights and narrower molecular weight distributions than were obtained in the use of the butyl acetates solvents in the above described acrylic polymerizations.

TABLE 7

| | Run 4-1 | | Runs 4-2 to 4-5 | |
|---|---|---|---|---|
| | wt. (gms) | wt. % | wt. (gms) | wt. % |
| Resin(1) | 1,237.6 | 36.4 | 1,237.6 | 36.4 |
| Coating Solvent(4) | 605.2 | 17.8 | 605.2 | 17.8 |
| VARSOL - 18(2) | 224.4 | 6.6 | — | — |
| AROMATIC 100 | — | — | 224.4 | 6.6 |
| n-Butanol | 160 | 4.7 | 160 | 4.7 |
| CYMEL 303(3) | 340 | 10.0 | 340 | 10.0 |
| TiO2(3) | 816 | 24.0 | 816 | 24.0 |
| BYK Catalyst 451(3) | 16.8 | 0.5 | 16.8 | 0.5 |
| Total | 3,400.0 | 100.0 | 3,400.0 | 100.0 |

(1)Resin as charged included the polymerization solvent.
(2)Hydrocarbon solvent (Exxon USA), 8% aromatic solvent (at least 8 or more carbon atoms per molecule), 92% saturated aliphatic hydrocarbons; boiling range 156–204° C.
(3)For descriptions, see footnotes to Table 4 above.
(4)As indicated in Table 8.

In a separate run (Run 4-6), a paint coating composition was formed using a resin prepared using the procedure of Example 1 (Run 1-4) using 364 gms of hexyl acetate and 156 gms of AROMATIC 100 solvent as the polymerization solvent blend, and a reaction temperature of 150° C. The coating composition was formulated

TABLE 6

Polymerization in Ester Solvents

| | \multicolumn{8}{c}{Run No.} | | | | | | | |
|---|---|---|---|---|---|---|---|---|
| | 3-1 | 3-2 | 3-3 | 3-4 | 3-5 | 3-6 | 3-7 | 3-8 |
| | | | | Ester Solvent | | | | |
| Resin Properties | n-butyl acetate | primary amyl acetate | iso-butyl isobutyrate | C5/C8 blend(1) | hexyl acetate | hexyl acetate | heptyl acetate | heptyl acetate |
| Resin Viscosity (cs)(3) | 20,550 | 4,430 | 5,380 | 3,135 | 4,179 | 2,460 | 5,953 | 1,968 |
| Color (Gardner) <1 | <1 | <1 | <1 | <1 | <1 | <1 | <1 | |
| Percent Solids (wt %) | 70 | 70 | 70 | 70 | 70 | 70 | 70 | 70 |
| Mw | 57,949 | 10,687 | 9,978 | 6,168 | 7,283 | 5,310 | 7,679 | 3,857 |
| Mn | 2,912 | 2,500 | 1,676 | 1,649 | 1,583 | 1,587 | 1,949 | 1,313 |
| Mw/Mn | 19.9 | 4.2 | 5.9 | 3.7 | 4.6 | 3.3 | 3.9 | 2.9 |
| Reaction Temp. (°C.) | 132(2) | 145(2) | 149(2) | 159(2) | 150 | 162(2) | 150 | 168(2) |

(1)50:50 wt.: wt. blend of primary amyl acetate and 2-ethylhexyl acetate.
(2)Reflux temperature.
(3)Measured as kinematic viscosity, obtained with an Ubbelohde viscometer.

EXAMPLE 4

A series of five resins (Runs 4-1 through 4-5) were formed using the polymerization procedure of Example 1 except that the polymerization solvent comprised 520 grams of methyl aml ketone and the reaction temperature for each was 147° C.

Thereafter, paint coating compositions were formulated using the procedure of Example 2, except that the coating ingredients were as identified in Table 7 below:

using the procedure as described in Example 2 (Run 2-4). Thus, the coating solvent comprised a blend of hexyl acetate, AROMATIC 100 solvent and n-butanol, as indicated in Table 4 above for Run 2-4.

Each paint coating composition was tested to determine its electrical resistivity and viscosity, and then electrostatically sprayed onto panels (fabricated from rolled steel Bonderite ® 40 treated steel) using a high speed Turbobell (manufactured by Ransburg; model type: Monobell) at 28,000 rpm, employing a spray voltage of 90,000 volts, a paint feed rate of 95 ml/min and a spray distance of 13 inches (from the panel to the sprayer). The panels were attached to a conveyor belt and passed by the sprayer at the rate of 15 linear feet per minute. The panels were coated in 2 passes, with 2 minutes between the passes, and then allowed to stand for 5 minutes at ambient conditions after which the panels were baked at 350° F. for 15 minutes in an oven. The data thereby obtained are set forth in Table 8 below.

Thereafter, each resin was formulated into a paint coating composition using the procedure of Example 2, and the coating ingredients identified in Table 4 (Runs 2-1 through 2-5), with the selected ester coating solvent. Drawdown films were prepared from each paint coating composition, again following the procedure of Ex-

TABLE 8

Electrospray Coatings

|  | Run No. | | | | | |
| --- | --- | --- | --- | --- | --- | --- |
|  | 4-1 | 4-2 | 4-3 | 4-4 | 4-5 | 4-6 |
|  | | | Polymerization Solvent | | | |
|  | MAK | MAK | MAK | MAK | MAK | hexyl acetate |
|  | | | Coating Solvents | | | |
|  | MAK | primary amyl acetate | isobutyl isobutyrate | $C_5/C_8$ acetate[1] | hexyl acetate | hexyl acetate |
| Properties of Liquid Coating | | | | | | |
| Electrical resistivity (Megohms) | 0.10 | 0.35 | 0.35 | 0.40 | 0.40 | 1.8 |
| Viscosity Zahn #2 (sec.) | 21.4 | 21.2 | 21.8 | 22.3 | 21.7 | 21.6 |
| Film Properties | | | | | | |
| Film Thickness (mil.) | 1.0-1.2 | 1.0-1.2 | 1.0-1.2 | 1.0-1.2 | 1.0-1.2 | 1.0-1.2 |
| % Gloss 20° | 47 | 66 | 60 | 72 | 70 | 74 |
| 60° | 83 | 88 | 86 | 90 | 88 | 91 |
| Impact resistance (in. lbs) | 50 | 80 | 97 | 124 | 142 | 168 |

MAK = methyl amyl ketone
[1]50:50 wt.: wt. blend of primary amyl acetate and 2-ethylhexyl acetate.

From the data presented in Table 8, it is apparent that the ester solvents of this invention in Runs 4-2 through 4-6, when employed as coating solvents for formulation of high solids electrostatic spray coatings, provide forample 2. The formulated coatings and the baked drawdown films were tested to determine their properties, thereby providing the data summarized in Table 9 below.

TABLE 9

|  | Run No. | | | | |
| --- | --- | --- | --- | --- | --- |
|  | 5-1 | 5-2 | 5-3 | 5-4 | 5-5 |
|  | | | Coating Solvent | | |
|  | n-butyl acetate | primary amyl acetate | isobutyl isobutyrate | hexyl acetate | heptyl acetate |
| Coating Properties: | | | | | |
| Evaporation rate of coating solvent | 67 | 40 | 45 | 21 | 11 |
| Electrical Resistivity (Megohms) | 0.48 | 0.60 | 0.65 | 0.99 | 0.75 |
| Viscosity, Zahn #2 (sec) 25° C. | 22 | 23.4 | 24.1 | 24.6 | 26.0 |
| 8° C. | 29 | 34.6 | 39.1 | 38.9 | 43.4 |
| Percent solids (wt. %) | 60 | 60 | 60 | 60 | 60 |
| Surface tension (dynes/cm$^2$) | 30.9 | 30.9 | 29.4 | 30.9 | 31.0 |
| Flash point (°F.) | 76 | 82 | 78 | 82 | 86 |
| Film Properties[1] | | | | | |
| Gloss 20° | 65 | 73 | 70 | 75 | 69 |
| 60° | 91 | 91 | 90 | 90 | 90 |
| Impact resistance (in.-lbs) | 116 | 94 | 72 | 164 | 66 |
| Pencil hardness | 3H | 3H | 3H | 3H | 3H |
| Appearance | acceptable | cratering | acceptable | acceptable | acceptable |

[1]Observed on panels composed of phosphatized steel (Bonderite ® 40, manufactured by Parker Chemical Co.). Acceptable appearance films were observed on use of cold rolled steel panels with primary amyl acetate.

mulated coatings of significantly enhanced electrical resistivities as compared to the prior art methyl amyl ketone, and also enable the formation of electrostatically sprayed films which provide superior gloss and impact resistance. The combined use of the ester solvents of this invention as both polymerization solvent and coating solvent (Run 4-6) is especially superior in the resulting electrical resistivity of the formulated coating and in the gloss and impact resistance properties of the film achieved by electrostatic spraying of the thus-formulated coating.

EXAMPLE 5

The procedure of Example 1 was repeated in a series of five runs, except that the polymerization solvent comprised 364 grams of methyl isobutyl ketone and 156 grams of cumene.

From the data set forth in Table 9, it is seen that the ester solvents of this invention, and particularly hexyl acetate, provide electrical resistivities which are superior to that of the prior art butyl acetate, and at the same time enables the formation of high gloss films with high impact resistance. Hexyl acetate is particularly effective in forming a film of superior impact resistance, as determined on the drawdown films.

EXAMPLE 6

To a five liter flask equipped with a mechanical stirrer, an addition funnel and a reflux condenser was added, in a series of runs, 520 grams of the selected higher alkyl ester solvent as the polymerization solvent. The addition funnel (2 liter capacity) contained:

TABLE 10

|  | Grams | Wt. % |
|---|---|---|
| 2-hydroxyethyl methacrylate | 240 | 20 |
| Methyl methacrylate | 240 | 20 |
| Styrene | 120 | 10 |
| Butyl acrylate | 568 | 47.3 |
| Acrylic acid | 32 | 2.7 |
|  | 1,200 | 100.0 |

Added to the above mixture in the addition funnel was 65 grams of ethyl-3,3-di(t- amyl peroxy) butyrate. The liquids in the two additional funnels and in the reaction flask were kept under a nitrogen blanket (1 atm. $N_2$). The solvent blend in the reaction flask was heated at the indicated reaction temperature and the contents of the two funnels were added slowly, with stirring over a period of 4 hours. After completion of the addition, stirring and heating was continued for an additional one-half hour. Then 4 more grams of ethyl-3,3-di(t-amyl peroxy) butyrate dissolved in 20 gms of the selected ester solvent were added in small portions and stirring and heating was continued for $\frac{1}{2}$ hours to complete the polymerization. The thus-produced polymerized resins were then tested for their physical properties, yielding the data set forth in Table 11 below:

TABLE 11

Polymerization in Ester Solvents

| | Run No. | | | |
|---|---|---|---|---|
| | 6-1 | 6-2 | 16-3 | 6-4 |
| | | | Ester Solvent | |
| Resin Properties | hexyl acetate | heptyl acetate | octyl acetate | nonyl acetate |
| Resin Viscosity[1] (cs) | 1,170 | 602 | 549 | 472 |
| Color Gardner | <1 | <1 | <1 | <1 |
| Electrical Resistivity (Megohms) | >20 | >20 | >20 | >20 |
| Polymer Solids (wt. %) | 67.5 | 65.3 | 66.2 | 65.4 |
| $M_w$ | 4118 | 3028 | 2470 | 2181 |
| $M_n$ | 1953 | 1537 | 1310 | 1199 |
| $M_w/M_n$ | 2.10 | 1.97 | 1.88 | 1.82 |
| Reaction Temp. (°C.) | 157 | 169 | 182 | 196–204 |

[1]Measured as kinematic viscosity, obtained with an Ubbelohde viscometer, ASTM D445.

EXAMPLE 7

A series of four resins were formed using the procedure of Example 6 with the exception that the initiation catalyst was dicumyl peroxide instead of ethyl-3,3-di (t-amyl peroxy) butyrate. The thus produced polymerized resin were tested yielding the data set forth in Table 12.

As it can be seen in Tables 11 and 12 the resins produced in the higher ester solvents of this invention have superior properties with low molecular weights and very narrow molecular weight distribution ($M_w/M_n$). Resin of this type are most appropriate for the formulation of high solids coatings of low viscosities.

TABLE 12

Polymerization in Ester Solvents

| | Run No. | | | |
|---|---|---|---|---|
| | 7-1 hexyl- acetate | 7-2 heptyl- acetate | 7-3 octylacetate | 7-4 nonylacetate |
| Resin Visc. (cs) | 1449 | 698 | 292 | 234 |
| Polymer Solids (wt. %) | 66.3 | 65.8 | 64.8 | 63.2 |
| $M_w$ | 4534 | 3278 | 1974 | 1818 |
| $M_n$ | 1676 | 1645 | 1053 | 1007 |
| $M_w/M_n$ | 2.70 | 1.99 | 1.87 | 1.80 |
| Polymerization Temp. (°C.) | 160° | 170° | 192° | 204° |
| % Free Radical Initiator[1] | 5.4 | 5.4 | 5.4 | 5.4 |

[1]Dicumyl Peroxide (Luperox ™ 500R, supplied by Luirdol Division of Penwalt).

EXAMPLE 8

The polymerized resins obtained in Example 6 (without removal of the polymerization solvent) were then used to formulate a series of paint coating compositions employing the procedure of Example 2 and the coating ingredients identified in Table 13.

TABLE 13

|  | wt. (gms) | wt. % |
|---|---|---|
| Resin[1] | 1,463 | 41.6 |
| Ester Solvent | 364 | 10.3 |
| AROMATIC 100 | 196 | 5.6 |
| n-Butanol | 164.5 | 4.7 |
| CYMEL 303[2] | 402.5 | 11.4 |
| $TiO_2$[3] | 892.5 | 25.4 |
| Cycat ™ 4040[4] | 35 | 1.0 |
| TOTAL | 3,517.5 | 100.0 |

[1]Resin as charged included the polymerization solvent.
[2]Hexamethoxymethyl melamine, 100% solid resin (produced by American Cyanamid) as crosslinking amino resin.
[3]Ti-pure (E. I. Dupont de Nemours, Pigments Division) as pigment.
[4]Cycat ™ 4040 (American Cyanamid) as cure catalyst.

TABLE 14

Formulated Coatings with Resins Made in Higher Ester Solvents

| | Polymerization Solvent | | |
|---|---|---|---|
| | Heptyl Acetate | Octyl Acetate | Nonyl Acetate |
| | | (Obtain in Run) | |
| | 6-1 | 7-3 | 7-4 |
| | | Formulation solvent | |
| | Hexyl Acetate | Hexyl Acetate | Hexyl Acetate |
| Properties of liquid Coatings[1] | | | |
| Electrical Resistivity (Megohms) | 1.1 | 0.50 | 0.60 |
| Viscosity Zahn #2 (sec.) | 22.4 | 19.6 | 21.3 |
| Percent solids (wt. %) | 65 | 65 | 65 |
| Film Properties[2] | | | |
| Pencil Hardness | 2H | H | F |
| Appearance | good | good | good |

[1]Coatings were catalysed with 1% Cycat ® 4040 (American Cyanamid cure catalyst)
[2]Drawdown films were made on phosphatized steel panels (Bonderite ® 40 treated; manufactured by Parker Chemical Company). Films baked at 300° F. for 30 min.

It will be obvious that various changes and modifications may be made without departing from the invention and it is intended, therefore, that all matter contained in the foregoing description shall be interpreted as illustrative only and not limitative of the invention.

What is claimed is:

1. An improved process for forming acrylic copolymer resins suitable for electrostatic spraying in high solids coatings containing at least 50 wt % solids which comprises contacting under polymerizing conditions a polymerization mixture comprising at least one hydroxy-substituted alkyl (methyl)acrylate monomer and at least one non-hydroxy substituted alkyl (meth)acrylate monomer in the presence of a free radical initiator and a solvent therefor, said solvent being employed in an amount of from about 10 to 70 wt. % of the polymerization mixture, and said solvent comprising at least one normally liquid ester selected from the group consisting of compounds having the formula:

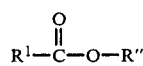

wherein $R^1$ is a straight or branched chain alkyl of 1 to 6 carbon atoms, and $R''$ is a straight or branched chain alkyl of 8 to 13 carbon atoms, with the proviso that $R^1$ and $R''$ together contain from 11 to 15 carbon atoms, said hydroxy-substituted alkyl (meth)acrylate monomer comprising from about 5 to 40 wt % of the total monomers charged to said polymerization reaction, and said non-hydroxy substituted alkyl (meth)acrylate monomer comprising from about 5 to 95 wt % of the total monomers charged to said polymerization reaction.

2. The process of claim 1 wherein said hydroxy-substituted alkyl (meth)acrylate monomer comprises a member selected from the group consisting of monomers of the formula:

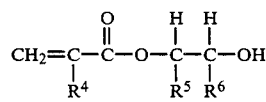

wherein $R^4$ is hydrogen or methyl and $R^5$ and $R^6$ are independently selected from the group consisting of hydrogen and alkyl of from 1 to 6 carbon atoms.

3. The process according to claim 1 wherein said non-hydroxy substituted alkyl (meth)acrylate monomer comprises at least one monomer of the formula:

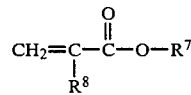

wherein $R^7$ is alkyl of from 1 to 6 carbon atoms and $R^8$ is hydroxy or methyl.

4. The process according to claim 1 wherein ester solvent is employed in admixture with at least one alkyl-substituted benzene solvent in which the alkyl substituent(s) contain a total of at least 2 carbon atoms when the benzene ring is monoalkyl substituted and contains a total of at least 3 carbon atoms when the benzene ring is substituted by two or more alkyl groups.

5. The process according to claim 4 wherein said alkyl-substituted benzene solvent comprises at least 1 aromatic compound of the formula:

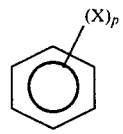

wherein p is an integer of from 1 to 4, and X is in each instance in which it appears independently selected from the group consisting of straight and branched-chain alkyl of from 1 to 4 carbon atoms, with the proviso that when p is 1, X must contain at least 2 carbon atoms and with the further proviso that when p is 2 or higher, the X groups must contain a total of at least 3 carbon atoms, and mixtures of the foregoing aromatic compounds.

6. The process according to claim 1 wherein said polymerization reaction is effected for a time of from about 0.5 to 10 hours.

7. The process according to claim 1 wherein the acrylic polymer produced in said polymerization reaction is characterized by a weight average molecular weight of from about 8,000 to about 12,000.

8. The process according to claim 1 wherein said normally liquid ester solvent comprises at least one member selected from the group consisting of alkyl acetates having a total of from carbon atoms in the alkyl moiety.

9. A polymerizable composition comprising a mixture of acrylic resin monomers and from about 5 to 70 wt % of a solvent comprising at least one normally liquid ester selected from the group consisting of compounds having the formula:

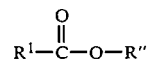

wherein $R^1$ is a straight or branched chain alkyl of 1 to 6 carbon atoms, and $R''$ is a straight or branched chain alkyl of 8 to 13 carbon atoms, with the proviso that $R^1$ and $R''$ together contain from 11 to 15 carbon atoms.

10. A polymerizable composition suitable for application after polymerization to a surface by electrostatic spraying as a high solids coating which comprises
 (a) from about 30 to 45 wt % of a monomer mixture omprising
  (i) at least one hydroxy-substituted alkyl (meth)acrylate in an amount of from about 5 to 40 wt % of said monomer mixture;
  (ii) at least one non-hydroxy substituted alkyl (meth)acrylate monomer in an amount of from about 5 to 95 wt % of said monomer mixture; and
  (iii) at least one free radical polymerization initiator in an amount of from about 0.5 to 6 wt % of said monomer mixture; and
 (b) from about 5 to 70 wt % of a polymerization solvent comprising at least one normally liquid ester selected from the group consisting of compounds having the formula:

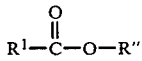

wherein $R^1$ is a straight or branched chain alkyl of 1 to 6 carbon atoms, and $R''$ is a straight or branched chain alkyl of 8 to 13 carbon atoms, with the proviso that $R^1$ and $R''$ together contain from 11 to 15 carbon atoms.

11. The polymerizable composition of claim 10 wherein said monomer mixture further comprises from about 5 to 30 Wt. % of at least one monovinyl aromatic hydrocarbon containing from 8 to 12 carbon atoms.

12. Low viscosity acrylic resins, suitable for electrostatic spraying as a coating containing at least 50 wt % solids upon a surface, which comprise resins formed by polymerization of from about 30 to 95 wt % of an acrylic monomer mixture in the presence of from about 5 to 70 wt % of a polymerization solvent comprising at least one normally liquid ester selected from the group consisting of compounds having the formula:

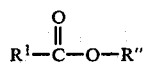

wherein $R^1$ is a straight or branched chain alkyl of 1 to 6 carbon atoms, and $R''$ is a straight or branched chain alkyl of 8 to 13 carbon atoms, with the proviso that $R^1$ and $R''$ together contain from 11 to 15 carbon atoms, said acrylic monomer mixture comprising
  (i) at least one hydroxy-substituted alkyl (meth)acrylate in a mount of from about 5 to 40 wt % of said monomer mixture;
  (ii) at least one non-hydroxy substituted alkyl (meth)acrylate monomer in an amount of from about 5 to 95 wt % of said monomer mixture; and
  (iii) at least one free radical polymerization initiator in an amount of from about 0.5 to 6 wt % of said monomer mixture, said acrylic resin being characterized by weight average molecular weights of from about 1,000 to 10,000 by kinematic viscosities of up to 6,000 cs and by weight average molecular weight to number average molecular weight ratios of from about 1 to 5.

13. The low viscosity acrylic resins of claim 12 wherein said acrylic monomer mixture additionally comprises from about 5 to 30 wt. % of at least one monovinyl aromatic hydrocarbon containing from 8 to 12 carbon atoms, and either (i) from about 2 to 5 wt. % of acrylic acid, or (ii) from about 3 to 10 wt. % of at least one member selected from the group consisting of vinychloride, acrylonitrile, methacrylonitrile and vinyl acetate.

14. The process according to claims 1, 2, 3, 4, 5, 6, or 7 wherein said normally liquid ester comprises a member selected from the group consisting of nonyl acetates, decyl acetates, undecyl acetates, dodecyl acetates, tridecyl acetates and mixtures thereof.

15. The polymerizable composition according to claim 9 wherein said normally liquid ester comprises a member selected from the group consisting of nonyl acetates, decyl acetates, undecyl acetates, dodecyl acetates, tridecyl acetates and mixtures thereof.

16. The polymerizable composition according to claims 10 or 11 wherein said normally liquid ester comprises a member selected from the group consisting of nonyl acetates, decyl acetates, undecyl acetates, dodecyl acetates, tridecyl acetates and mixtures thereof.

17. The low viscosity acrylic resins according to claims 12 or 13 wherein said normally liquid ester comprises a member selected from the group consisting of nonyl acetates, decyl acetates, undecyl acetates, dodecyl acetates, tridecyl acetates and mixtures thereof.

* * * * *